Patented Feb. 17, 1948

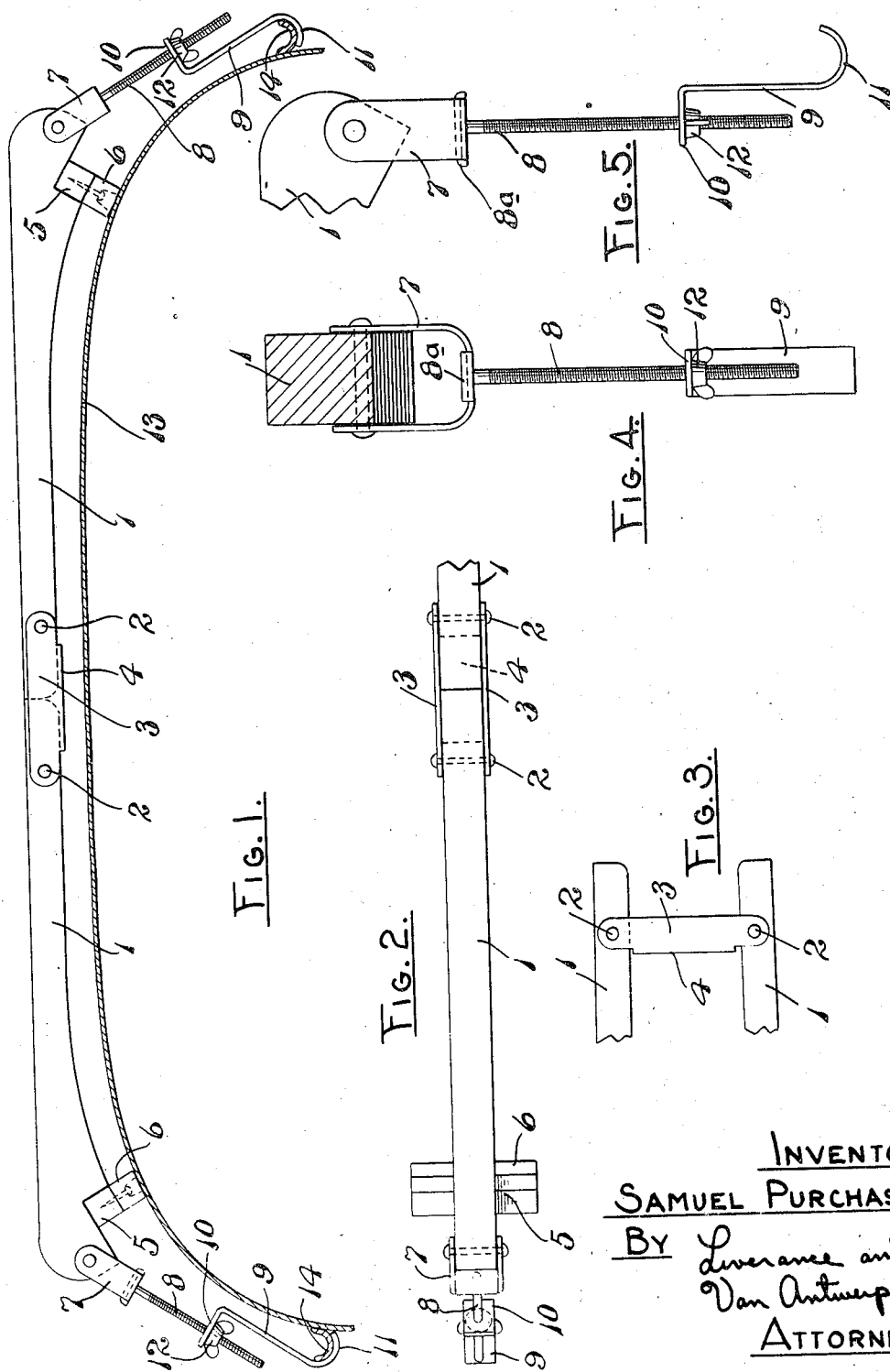

2,436,228

UNITED STATES PATENT OFFICE 2,436,228

AUTO LUGGAGE CARRIER

Samuel Purchase, Grand Rapids, Mich.

Application April 8, 1946, Serial No. 660,532

3 Claims. (Cl. 224—29)

This invention relates to a luggage carrier attachment which may be quickly and readily applied and secured to an automobile body at and above its top, and is as quickly released and removed when it is not to be used, being foldable to occupy greatly decreased space in length when not in use, it is connected in place by releasable engagement at each end thereof, with the side drainage gutters which form a part of automobile body construction. The luggage carrier bears adjacent its ends against the upper side of the top, using supporting feet for such purpose which will be of a soft material, for example, a rubber composition, thereby insuring against marring or otherwise defacing the finish of the top. In general two at least of said luggage carrier attachments will be required to equip an automobile, and, of course, more may be used, and they are spaced in the length of the automobile top at desired selected distances from each other.

It is a primary object and purpose of the present invention to provide a simple, practical, very effective, easily attached and removable luggage carrier for automobiles, which may be manufactured economically and be strong and durable for the service which it is to perform.

An understanding of the invention may be had from the following description taken in connection with the accompanying drawing, in which, Fig. 1 is an elevation of the luggage carrier attachment in use detachably connected at the upper side of an automobile body, the upper portion or top of said body being shown in section.

Fig. 2 is a fragmentary plan view of the luggage carrier attachment.

Fig. 3 is a fragmentary elevation illustrating the manner in which the carrier attachment is folded when not in use.

Fig. 4 is an enlarged section transverse of the luggage carrier at one end and showing the connecting means used at each end thereof in elevation.

Fig. 5 is a side elevation of the structure showing Fig. 4.

Like reference characters refer to like parts in the different figures of the drawing.

In the construction shown, two bars 1 which may be of wood are pivotally connected near adjacent ends at 2 to the ends of side flanges 3 of a channel member, the web 4, of which is integral with the flanges and is shorter than the flanges. As indicated in Fig. 1, when the bars 1 are unfolded and brought into longitudinal alinement the adjacent ends of said bars are close together and the web 4 is located at the underside of said bar at their adjacent ends, thereby reinforcing the structure when in use.

The outer end of each bar is somewhat widened and cut away at its underside providing a recess into which a short bar 5 may be located and permanently secured, one for each of the carrier bars toward the outer ends thereof. At the underside of each bar 5, a foot-member 6 is secured and which as indicated, in dotted lines in Fig. 1, is recessed at its underside not only to elevate the heads of the attaching means used, but to make the lower portion of part 6 of greater flexibility so as to more easily conform to the top surface of an automobile body against which it bears when in use. At the outer end of each bar a U-shaped stirrup 7 is pivotally connected, a threaded rod 8 passes through the bottom of each stirrup 7, and has a flathead 8a at its upper end which lies against the bottom of the stirrup as shown in Figs. 4 and 5. A bar 9, of flat metal, has its upper end portion bent at right angles to make the leg 10, through an opening in which the rod 8 passes. At its lower end portion the bar 9 is formed with a curved hook 11. The rod 8 which passes through the leg 10, is supplied with a thumb nut 12 below the leg, so that said leg and the hook 11 connected therewith may be adjusted lengthwise to rod 8.

The top 13 of an automobile body of conventional design at each side and below the upper portion of said top carries a longitudinal gutter 14, permanently secured to, or made integral with the top for drainage purposes. The luggage carrier of the construction described, in its unfolded position with the bars 1 in alignment, is located above and across the top 13, with the flexible foot-member 16 bearing against the upper side of the top. The hooks 11 are engaged against the undersides of the opposite side gutters 14, and thereafter, by operating the thumb nuts 12, both of said hooks may be drawn into snug engagement against the undersides of said gutters, and at the same time foot-members 6 pressed against the underside of the top 13. To release the luggage carrier attachment it is necessary merely to unscrew the thumb nuts 12 required distances. A number of the carrier structures described may be placed across the top and above it, spaced from each other and independently secured in place. When an attachment is removed the bars 1 may be folded, or turned about the pivot pins 2 to lie substantially parallel to each other as indicated in Fig. 3. This reduces the length of the structure to substantiate one-half of its length when in use, thereby greatly facilitating carrying in the trunk of an automobile, for example, when it is not used.

The structure is very practical and effective, strong and durable, readily applied and secured in place when it is to be used, and likewise readily removed and folded when not used. The invention is defined in the appended claims and is to be considered comprehensive of all forms and structures coming within their scope.

I claim:

1. In a luggage carrier construction, two bars having one end of each adjacent to the other, connecting means at the adjacent ends of the bars comprising a channel element including a horizontal web and upwardly extending flanges with the web underneath adjacent end portions of the bars and said flanges embracing the adjacent sides of the bars, means pivotally connecting said flanges to said bars adjacent the outer ends of the flanges and a distance from adjacent ends to the bars, said bars being adapted to be disposed in horizontal alignment or folded in substantial parallelism, a U-shaped stirrup pivotally connected at the outer end of each bar and adapted to extend downwardly and outwardly therefrom, a threaded rod connected with each stirrup and extending therefrom, members of flat metal having ends portion bent at an angle to the bodies of said members and through one of which each of said rod pass, the opposite end portions of said members being formed into hooks open at their upper sides, nuts threaded on the rods to engage against the undersides of the end portions of said members through which the rods pass, and foot-members connected one adjacent the outer end and the underside of each of said bars.

2. In a luggage carrier construction, two bars in alinement having their inner ends adjacent each other, means for pivotally connecting said inner ends together, means at said pivotal connection to maintain said bars in horizontal alinement against downward pressure, a foot member extending downwardly adjacent the outer end of each bar, and means at the outer end of each bar for connection to a supporting object.

3. The elements of claim 2, in which said pivotal and alinement means comprises a pivot member pivotally connected to each of said bars, a distance from its inner end and rigid means on said pivot member extending under and engageable by the inner ends of said bars.

SAMUEL PURCHASE.

REFERENCES CITED

The following references are of record in the file of this patent:

UNITED STATES PATENTS

| Number | Name | Date |
|---|---|---|
| 2,119,051 | LeBoeuf | May 31, 1938 |
| 2,357,203 | Jimmes | Aug. 29, 1944 |

FOREIGN PATENTS

| Number | Country | Date |
|---|---|---|
| 470,264 | Great Britain | Aug. 11, 1937 |
| 776,636 | France | Nov. 8, 1934 |
| 789,793 | France | Aug. 26, 1935 |